(12) United States Patent
Nisarga et al.

(10) Patent No.: US 12,321,306 B2
(45) Date of Patent: *Jun. 3, 2025

(54) METHODS AND APPARATUS TO ENABLE STATUS CHANGE DETECTION IN A LOW POWER MODE OF A MICROCONTROLLER UNIT

(71) Applicant: TEXAS INSTRUMENTS INCORPORATED, Dallas, TX (US)

(72) Inventors: Bhargavi Nisarga, Allen, TX (US); Ruchi Shankar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 527 days.

This patent is subject to a terminal disclaimer.

(21) Appl. No.: 16/713,296

(22) Filed: Dec. 13, 2019

(65) Prior Publication Data

US 2020/0117633 A1 Apr. 16, 2020

Related U.S. Application Data

(63) Continuation of application No. 15/055,836, filed on Feb. 29, 2016, now Pat. No. 10,545,908.

(51) Int. Cl.
*G06F 13/12* (2006.01)
*G06F 1/3206* (2019.01)
(Continued)

(52) U.S. Cl.
CPC ........ *G06F 13/4282* (2013.01); *G06F 1/3206* (2013.01); *G06F 1/325* (2013.01);
(Continued)

(58) Field of Classification Search
CPC ...... G06F 1/3206; G06F 1/3234; G06F 1/325; G06F 1/3253; G06F 1/3287;
(Continued)

(56) References Cited

U.S. PATENT DOCUMENTS 5,793,672 A * 8/1998 Wong .................. G11C 7/1078
365/189.05
6,963,933 B2 * 11/2005 Saito ....................... G06F 1/266
710/33

(Continued)

OTHER PUBLICATIONS

"MIC2555 USN-OTG Transceiver". M9999-121406. Dec. 2006. Micrel Inc. (Year: 2006).*

(Continued)

*Primary Examiner* — Thomas J. Cleary
(74) *Attorney, Agent, or Firm* — Brian D. Graham; Frank D. Cimino

(57) ABSTRACT

Methods, apparatus, systems, and articles of manufacture to enable status change detection in a low power mode of a microcontroller unit are disclosed herein. An example integrated circuit (IC) includes a controller to determine that the IC is to enter a low power mode. The example IC includes a universal serial bus (USB) physical layer integrated circuit including a transceiver and a detector circuit. The transceiver is disabled while in the low power mode. The detector circuit is enabled while in the low power mode. The detector circuit is to determine whether a pinout of a USB receptacle is shorted to ground. The example IC includes a power control module (PCM) to disable the controller when entering the low power mode. Upon receipt of an indication that the ID pinout of the USB receptacle is shorted to the ground, the PCM initiates a boot sequence.

17 Claims, 5 Drawing Sheets

(51) Int. Cl.
*G06F 1/3234* (2019.01)
*G06F 1/3287* (2019.01)
*G06F 13/40* (2006.01)
*G06F 13/42* (2006.01)

(52) U.S. Cl.
CPC .......... *G06F 1/3253* (2013.01); *G06F 1/3287* (2013.01); *G06F 13/4068* (2013.01); *Y02D 10/00* (2018.01)

(58) Field of Classification Search
CPC ............. G06F 11/3027; G06F 13/4068; G06F 13/4081; G06F 13/4282; Y02D 10/00; Y02D 30/50
See application file for complete search history.

(56) References Cited

U.S. PATENT DOCUMENTS

| | | | |
|---|---|---|---|
| 10,545,908 B2* | 1/2020 | Nisarga | G06F 1/3253 |
| 2004/0133820 A1 | 7/2004 | Tanabe et al. | |
| 2005/0114580 A1* | 5/2005 | Ede | G06F 13/4081 |
| | | | 710/305 |
| 2009/0199022 A1* | 8/2009 | Fukuda | H04N 1/00885 |
| | | | 713/300 |
| 2013/0300343 A1 | 11/2013 | Files et al. | |
| 2014/0047257 A1 | 2/2014 | Masson et al. | |
| 2014/0101345 A1* | 4/2014 | Ranta | G06F 11/3051 |
| | | | 710/16 |
| 2014/0173141 A1* | 6/2014 | Waters | G06F 1/266 |
| | | | 710/16 |
| 2015/0058642 A1 | 2/2015 | Okamoto et al. | |
| 2015/0253842 A1* | 9/2015 | Murata | G06F 1/3287 |
| | | | 713/323 |
| 2015/0333735 A1* | 11/2015 | Elias | H03K 3/01 |
| | | | 327/540 |
| 2015/0340898 A1* | 11/2015 | Schwartz | G06F 1/3212 |
| | | | 320/103 |
| 2015/0362984 A1* | 12/2015 | Waters | G06F 1/266 |
| | | | 713/324 |
| 2016/0054786 A1* | 2/2016 | Chenault | G06F 13/4022 |
| | | | 710/313 |
| 2016/0226559 A1 | 8/2016 | Miyaoka | |
| 2016/0306771 A1* | 10/2016 | Chen | G06F 13/4286 |
| 2017/0124016 A1* | 5/2017 | Gerber | G06F 13/4282 |
| 2017/0154001 A1* | 6/2017 | Filser | G06F 13/364 |

OTHER PUBLICATIONS

"On-The-Go and Embedded Host Supplement to the USB Revision 2.0 Specification". Revision 2.0. May 8, 2009. LSI Corporation et al. (Year: 2009).*

Campbell, Michael. Transition Existing Products from USB 2.0 OTG to USB Type-C. Jul. 2015. Texas Instruments, Inc. (Year: 2015).*

* cited by examiner

METHODS AND APPARATUS TO ENABLE STATUS CHANGE DETECTION IN A LOW POWER MODE OF A MICROCONTROLLER UNIT

CROSS-REFERENCE TO RELATED APPLICATIONS

This application is a continuation of U.S. patent application Ser. No. 15/055,836 filed Feb. 29, 2016, which is hereby fully incorporated herein by reference for all purposes.

FIELD OF THE DISCLOSURE

This disclosure relates generally to Universal Serial Bus circuitry, and, more particularly, to methods and apparatus to enable status change detection in a low power mode of a microcontroller unit.

BACKGROUND

Universal Serial Bus (USB) is a standard that defines cables, connectors, and/or communications between two devices. USB devices are usually identified as being a host device or a peripheral device. In some cases, devices may be able to switch between being a host device and a peripheral device.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
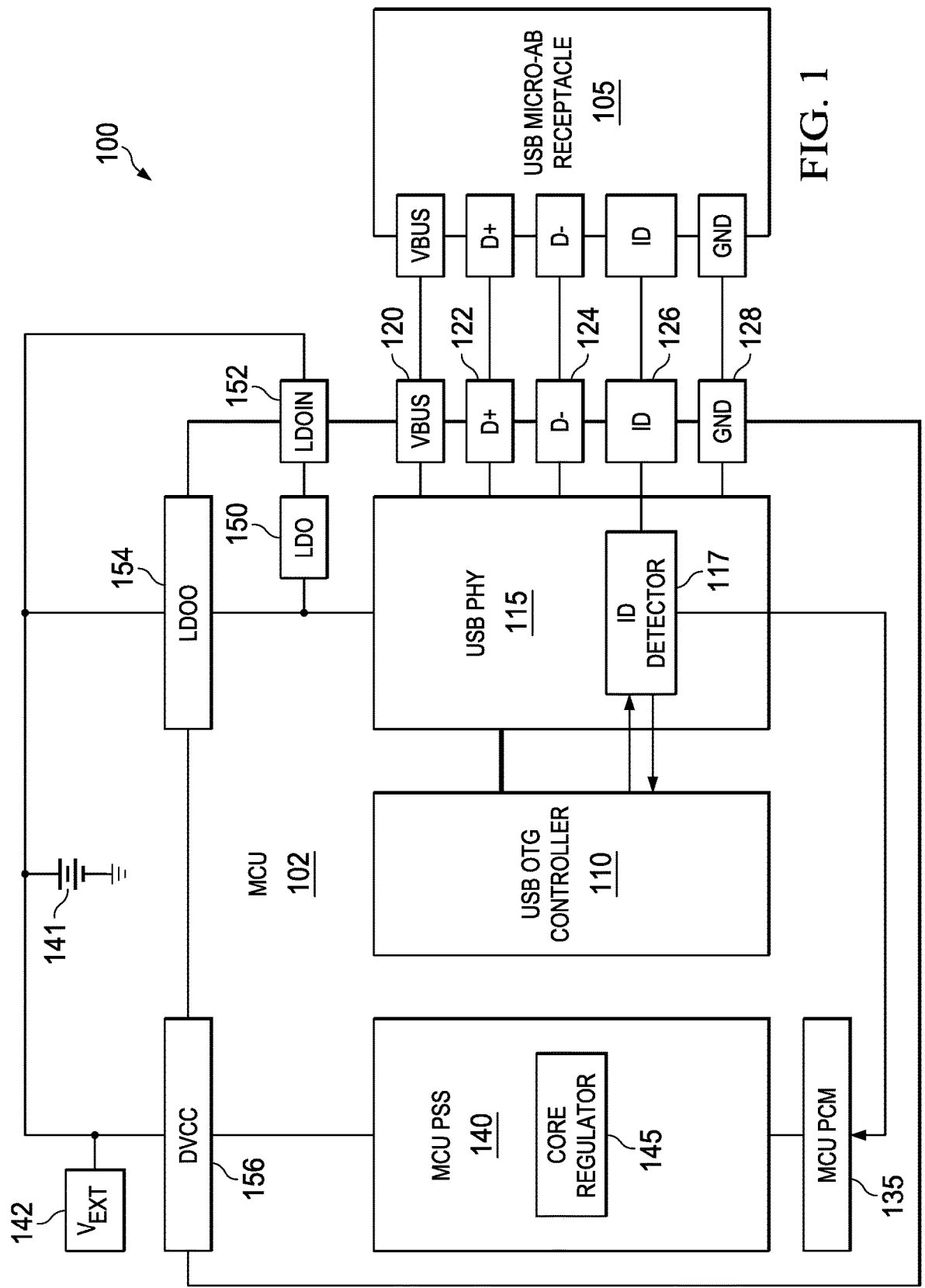
FIG. 1 is a block diagram of an example system constructed in accordance with the teachings of this disclosure to detect a status change in a low power mode.

Traditional Universal Serial Bus (USB) operation uses a host device and a peripheral device. At a time of manufacture, standard USB devices are defined to be a host or a peripheral. For example, a personal computer (PC) might be defined to be a host, while a printer might be defined to be a peripheral.

USB On The Go (OTG) standards enable devices to switch between being a host and being a peripheral. For example, a smartphone may, when connected to a personal computer, act as a peripheral. However, when an input device (e.g., a keyboard, a mouse, etc.) is connected to the smartphone (e.g., via the same USB port), the smartphone may act as a host.

There are two types of USB OTG devices: an A device, and a B device. Upon initialization of a USB communication session, the A device operates as a host. In contrast, upon initialization of a USB communication session, the B device operates as a peripheral.

USB receptacles are included on devices to enable a USB cable to be plugged into the device. As used herein, USB cables that can be inserted into a USB receptacle are terminated in a USB plug. Different standards for USB receptacles and USB plugs exist. For example, a USB micro-A receptacle is used in USB A devices and is physically dimensioned to receive a USB micro-A plug. Conversely, a USB micro-B receptacle is used in USB B devices and is physically dimensioned to receive a USB micro-B plug. The USB micro-A plug is physically dimensioned such that it cannot be inserted into the USB micro-B receptacle. Likewise, the USB micro-B plug is physically dimensioned such that it cannot be inserted into the USB micro-A receptacle. However, some devices include a USB micro-AB receptacle that is physically dimensioned to receive both a USB micro-A plug and a USB micro-B plug.

As used herein, an A device is a device with an A receptacle or a device with a micro-A plug inserted into its receptacle. An A device supplies power to a VBUS pin of an attached USB cable. Upon the start of a USB communication session, the A device operates as the host. If the A device is OTG enabled, the A device may relinquish the role of host to an OTG B device.

As used herein, a B device is a device with a standard-B receptacle, a mini-B receptacle, a micro-B receptacle, a micro-AB receptacle with either a micro-B plug or no plug inserted into its receptacle, or a captive cable ending in a Standard-A or Micro-A plug. B devices do not supply power to the VBUS pin of an attached USB cable. Upon the start of a USB communication session, the B device functions as a peripheral. If the B device is OTG enabled (i.e., it is equipped with a micro-AB receptacle), the B device may be granted the role of the host from the OTG enabled A device.

Some A devices include system on a chip (SoC) circuitry. In some examples, the SoC circuitry is referred to as a microcontroller unit (MCU). MCUs may operate in different power modes. For example, an MCU may operate in an active mode, a sleep mode, a deep sleep mode, a shutdown mode, etc. In the lowest power mode (e.g., shutdown mode), many components of the MCU are disabled to conserve power. In existing MCU systems, circuitry that interfaces with a USB receptacle is disabled in shutdown mode. As a result, the USB A device placed in the shutdown mode cannot detect when a USB micro-A plug has been inserted into a receptacle of the USB A device. As a result, the USB A device requires some other stimulus (e.g., a user pushing a button) to wake the MCU of the USB A device to begin performing its function as a host.

In examples disclosed herein, identification (ID) detection circuitry is included in a USB physical layer (PHY) circuit of the MCU. Including the ID detection circuitry in the PHY enables detection of insertion of a micro-A plug into the receptacle of the MCU without another stimulus to wake the MCU. In examples disclosed herein, in the shutdown mode, other components of the USB PHY circuit (e.g., a transceiver) and/or other components of the example MCU are disabled. However, in the shutdown mode of examples disclosed herein, the ID detection circuitry is enabled. The example ID detection circuitry monitors an ID pinout of the example MCU to detect insertion of a micro-A plug. In examples disclosed herein, the micro-A plug has an ID line that is shorted to ground. In contrast, a micro-B plug does not have an ID line that is shorted to ground. Likewise, when no plug is inserted, the ID pinout of the example MCU is not shorted to ground (e.g., the ID pinout is floating).

In examples disclosed herein, the ID detection circuitry detects when the ID pinout of the MCU is tied (e.g., shorted) to ground. Identifying that the ID pinout of the MCU is tied to ground indicates that a micro-A plug has been inserted, and that the MCU should be booted and begin operating as a USB A device. Such an approach results in very low power consumption while waiting for insertion of the micro-A plug. For example, by disabling components of the PHY circuit and/or, more generally, components of the MCU while in shutdown mode, power consumption is minimized.

FIG. 1 is a block diagram of an example system 100 constructed in accordance with the teachings of this disclosure to detect a status change in a low power mode. The example system 100 of FIG. 1 includes a microcontroller unit (MCU) 102 and a USB receptacle 105. In the illustrated example of FIG. 1, the example MCU 102 includes a USB on-the-go (OTG) controller 110 and a USB physical layer circuit (PHY) 115. The example PHY 115 provides an interface between digital communications of the OTG controller 115 and analog communications via the USB receptacle 105. In examples disclosed herein, the PHY 115 is in communication with a VBUS pinout 120, a first data pinout 122, a second data pinout 124, an ID pinout 126, and a ground pinout 128. The example PHY 115 includes an ID detector 117 that is connected to the ID pinout 126. The example ID detector provides a digital signal representing a status of the ID pinout 126 to the OTG controller 110 and an MCU power control module (PCM) 135. The example MCU PCM 135 controls an MCU power supply system (PSS) 140. The example PSS 140 includes a core regulator 145 that regulates voltages supplied to components of the MCU 102. In the illustrated example of FIG. 1, the example PSS 140 is connected to power storage circuitry 141. In the illustrated example of FIG. 1, the example PSS 140 is connected to a $V_{EXT}$ pinout 142 to, for example, receive power from a fixed power source.

The example MCU of FIG. 1 includes a low dropout regulator (LDO) 150. In some examples, the LDO 150 is included in the PSS 140. The example LDO 150 is an integrated circuit regulates voltages received via the LDOIN pinout 152, and outputs the regulated voltage to the LDOO pinout 154. In examples disclosed herein, the LDOO pinout 154 is connected to the LDOIN pinout 152, thereby creating a feedback loop. In the illustrated example, the LDOIN pinout 152 and the LDOO pinout 154 are connected to a DVCC pinout 156 that is connected to the PSS 140.

The example MCU 102 of the illustrated example of FIG. 1 is implemented as a system on a chip (SoC). In some examples, the MCU 102 includes additional components such as, for example, a memory module, an input or output peripheral, etc.

The example USB receptacle 105 of the illustrated example of FIG. 1 is implemented as a micro-AB USB receptacle. However, in some examples, the example USB receptacle may be implemented as a micro-A receptacle. The example USB receptacle 105 provides a port that receives a matching USB cable to, for example, connect the example MCU 102 to a host device and/or to a peripheral device.

The example OTG controller 110 of the illustrated example of FIG. 1 communicates with external USB devices using the PHY 115. In the illustrated example of FIG. 1, the OTG controller 110 is configured as a USB A device. That is, upon initialization of a USB session with an external device, the OTG controller 110 initially functions as a USB host. However, in some examples the OTG controller 110 is configured as a USB B device and, upon initialization of a USB session with an external device, initially functions as a USB peripheral. An example implementation of the example OTG controller 110 is further described in connection with FIG. 5.

The example PHY 115 of the illustrated example of FIG. 1 is an integrated circuit that provides an interface between digital communications of the OTG controller 110 and analog communications via the USB receptacle 105. In the illustrated example of FIG. 1, the example PHY 115 includes the example ID detector 117. The example ID detector 117 is connected to the ID pinout 126. When enabled, the example ID detector 117 monitors a voltage value of the ID pinout 126 to detect whether a USB micro-A cable has been inserted into the USB receptacle 105. An example implementation of the example PHY 115 is further described in connection with FIG. 4.

The example PCM 135 of the illustrated example of FIG. 1 controls operation of the PSS 140. In examples disclosed herein, the example PCM is implemented by digital circuitry (e.g., transistors). However, the example PCM may be implemented in any fashion such as, for example, using analog circuitry. An example implementation of the example PCM 135 is further described in connection with FIG. 6.

The example PSS 140 of the illustrated example of FIG. 1 supplies and/or regulates power to other components of the MCU 102. In the illustrated example, the example PSS 140 is connected to the example power storage circuitry 141. In the illustrated example of FIG. 1, the power storage circuitry is a battery. However, the example power storage circuitry 141 may be implemented in any other fashion. For example, the example power storage circuitry may additionally and/or alternatively be implemented as a capacitor. In some examples, the power storage circuitry 141 may be omitted (e.g., when the MCU is connected to an external power source via, for example, the VEXT pinout 142.)

As noted above, the example PSS 140 includes the core regulator 145. The core regulator 145 of the illustrated example of FIG. 1 regulates power and provides the same to, for example, the OTG controller 110. In the illustrated example of FIG. 1, the core regulator maintains a constant voltage level for use by the OTG controller 110. For example, the core regulator 145 may perform DC-DC conversion to supply a particular voltage to the OTG controller 110. However, any other approach to voltage and/or power regulation may additionally or alternatively be performed.

Figure 2:
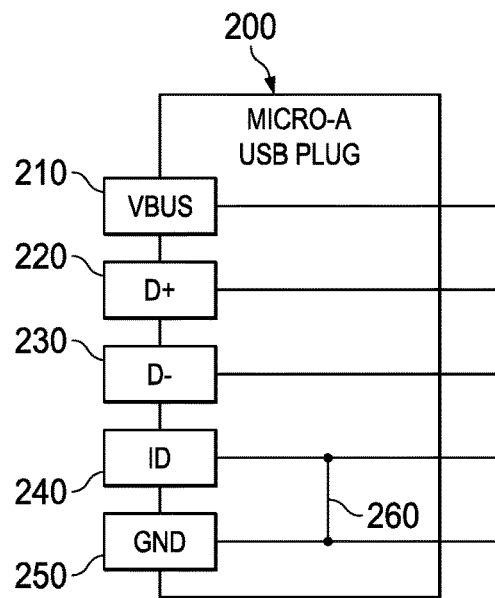
FIGS. 2 and 3 are diagrams illustrating example wiring configurations for example USB plugs.
Figure 3:
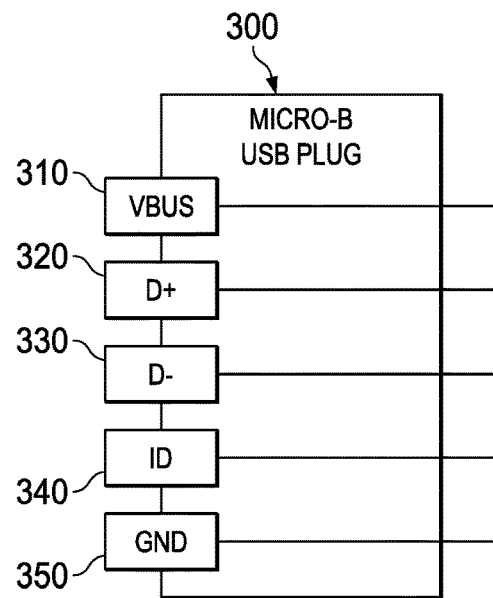

FIGS. 2 and 3 are diagrams illustrating example wiring configurations for example USB plugs that interface to the example USB receptacle 105 of FIG. 1. FIG. 2 is a diagram illustrating an example wiring configuration for an example micro-A USB plug 200. The example micro-A USB plug 200 of FIG. 2 includes a VBUS pin 210, a first data pin 220, a second data pin 230, an ID pin 240, and a ground pin 250. In examples disclosed herein, the first data pin 220 and the second data pin 230 are differential data pins. In the example micro-A USB plug 200 of FIG. 2, the ID pin 240 is shorted 260 to ground 250. When the micro-A USB plug is inserted into a micro-AB receptacle (e.g., the micro-AB receptacle 105 of FIG. 1) of an OTG enabled USB device, the ID pin 240 being shorted to the ground pin 250 instructs the USB device to initially act as the host.

FIG. 3 is a diagram illustrating an example wiring configuration for an example micro-B USB plug 300. The example micro-B USB plug 300 of FIG. 3 includes a VBUS pin 310, a first data pin 320, a second data pin 330, an ID pin 340, and a ground pin 350. In examples disclosed herein, the first data pin 320 and the second data pin 330 are differential data pins. In the example micro-B USB plug 300 of FIG. 3, the ID pin 340 is pulled up (e.g., is not shorted to the ground pin 350). When the micro-B USB plug 300 is inserted into a micro-AB receptacle (e.g., the micro-AB receptacle 105 of FIG. 1) of an OTG enabled USB device, the ID pin 240, not being shorted to the ground pin 250, does not indicate that the micro-A USB plug 200 is inserted. As a result, the USB device initially acts as a peripheral.

Figure 4:
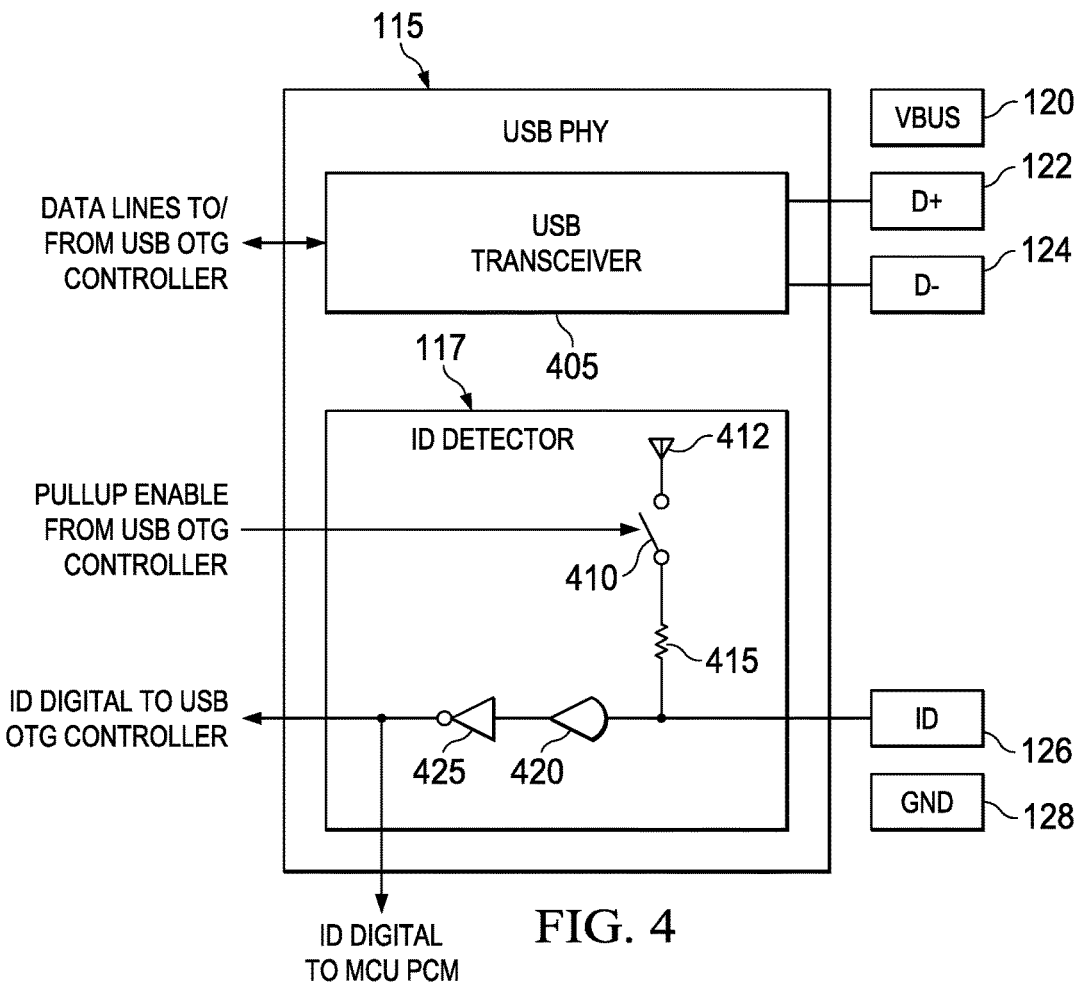
FIG. 4 is a block diagram illustrating an example implementation of the physical layer (PHY) circuit of FIG. 1.

FIG. 4 is a block diagram illustrating an example implementation of the PHY 115 of FIG. 1. In the illustrated example of FIG. 4, the example PHY 115 includes the ID detector 117 and a USB transceiver 405. The example ID detector 117 is connected to the ID pinout 126. The USB transceiver 405 is connected to the first data pinout 122 and the second data pinout 124.

The example USB transceiver 405 converts digital communications received from the OTG controller 110 into analog communications for transmission via the first data pinout 122 and the second data pinout 124 to a device that is connected to the USB receptacle 105 (e.g., directly connected to the USB receptacle 105 and/or connected to the USB receptacle 105 via a cable, hub, etc.). Likewise, the example USB transceiver 405 converts analog communications via the first data pinout 122 and the second data pinout 124 (e.g., from a device connected to the USB receptacle 105) into digital communications for transmission to the OTG controller 110. When in the low power mode, the example USB transceiver 405 is disabled to conserve power. Upon waking up from the low power mode, the example USB transceiver 405 is enabled.

The example ID detector 117 includes switch 410, a pullup resistor 415, a level shifter 420, and an inverter 420. The example switch 410 is connected to a power source 412 (e.g., the power storage circuit 141 via the LDOO pinout 154). In examples disclosed herein, the switch 410 is controlled from an ID pullup instruction received from the OTG controller 110. In examples disclosed herein, the switch 410 is implemented using one or more transistor circuits. However, the example switch 410 may be implemented in any other fashion. When the switch is open, the ID detector 117 does not detect changes in the state of which type of USB cable is inserted. When the switch 410 is closed, a voltage at the ID pinout 126 differs based on whether a USB micro-A plug is inserted into the receptacle. If, for example, the switch 410 is closed and a USB micro-A plug is inserted (where the ID pinout 126 is shorted to ground), the ID pinout 126 will have a voltage equal to ground. In contrast, if, for example, the switch 410 is closed and a USB micro-A plug is not inserted (e.g., the ID pinout 126 is not shorted to ground), the ID pinout 126 will have a voltage that is pulled up. Unlike the example USB transceiver 405, the example ID detector 117 is not disabled when in the low power mode. Rather, the ID detector 117 is enabled by, for example, closing the switch 410 prior to (and/or upon) entering the low power mode.

When the example switch 410 is closed, current flows from a source 412 to the pullup resistor 415. In examples disclosed herein, the source 412 is the power storage circuit 141 of FIG. 1. However, the example switch 410 may be connected to any other power source such as, for example, the $V_{EXT}$ pinout 142 of FIG. 1, the VBUS pinout 120 of FIG. 1, etc.

In the illustrated example of FIG. 4, the example pullup resistor 415 is connected to the switch 410. In examples disclosed herein, the pullup resistor is a one mega ohm resistor. However, any other value resistor may additionally or alternatively be used. Using a pullup resistor with a high resistance value reduces the amount of current flowing through the pullup resistor, and likewise reduces an amount of current sourced by the example power storage circuit 141.

In the illustrated example of FIG. 4, when the switch 410 is closed, current flows from the source 412 through the switch 410 and the pullup resistor 415 to the inverter 420 and/or the ID pinout 126. When no USB plug is inserted into the receptacle 105 of FIG. 1, the voltage at the input to the level shifter 420 (e.g., the voltage at the ID pinout 126) is pulled up. Likewise, when a USB micro-B plug is inserted into the receptacle 105 of FIG. 1, the voltage at the input to the level shifter 420 (e.g., the voltage at the ID pinout 126) is also pulled up. However, when a USB micro-A plug is inserted into the receptacle 105 of FIG. 1 (e.g., where the ID line within the USB micro-A plug is tied to the ground line), the voltage at the input to the level shifter 420 (e.g., the voltage at the ID pinout 126) will be pulled low (e.g., grounded) due to the voltage drop across the pullup resistor 415.

The example level shifter 420 amplifies a voltage level of an input (e.g., the ID pinout 126). For example, the example level shifter 420 may modify the voltage level of the input (e.g., the ID pinout 126) to transition the voltage level from the a level provided by the voltage source 412 to a level that can be properly interpreted by the example inverter 425 and/or the example PCM 135. In examples disclosed herein, the example level shifter is implemented as an amplifier. However, any other analog and/or digital circuitry may additionally or alternatively be used such as, for example, a comparator. When the input of the example level shifter 420 is pulled up, the example level shifter 420 produces an output voltage representative of a binary one (e.g., a Transistor-Transistor Logic (TTL) voltage of five volts). When the input of the example level shifter 420 is grounded, the example level shifter 420 produces an output voltage representative of a binary zero (e.g., a TTL voltage of zero volts).

The example inverter 425 inverts the output of the example level shifter 420. When the output of the example level shifter is a binary one (e.g., the ID pinout 126 is pulled up), the example inverter 425 produces a binary zero. When the output of the example level shifter 420 is a binary zero (e.g., the ID pinout 126 is grounded), the example inverter 425 produces a binary one. As such, a binary one is produced when a USB micro-A plug (e.g., the USB micro-A plug 200 of FIG. 2) is inserted into the USB receptacle 105. A binary zero is produced when either a USB micro-B plug (e.g., the USB micro-B plug 300 of FIG. 3) or no USB plug is inserted into the USB receptacle 105.

Figure 5:
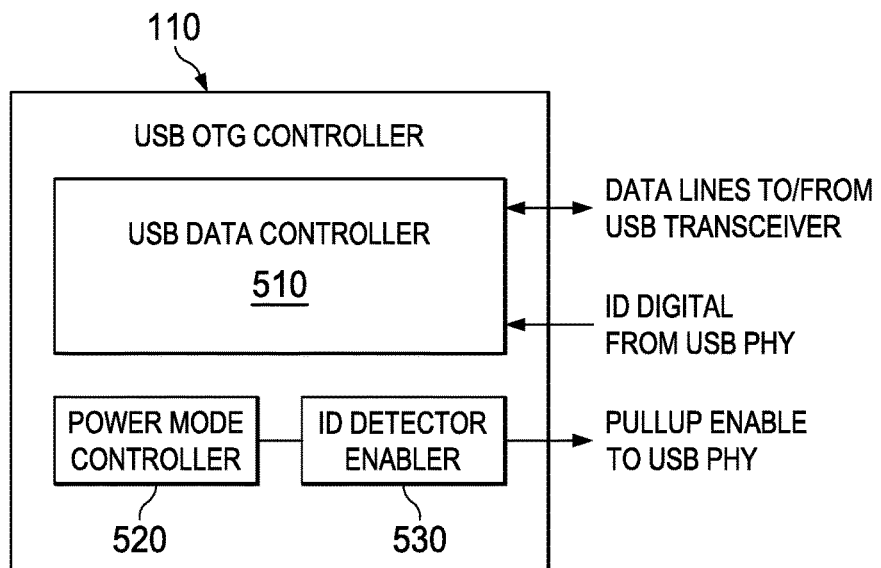
FIG. 5 is a block diagram of an example implementation of the universal serial bus (USB) on-the-go (OTG) controller of FIG. 1.

FIG. 5 is a block diagram of an example implementation of the OTG controller 110 of FIG. 1. In the illustrated example of FIG. 5, the example OTG controller 110 includes a USB data controller 510, a power mode controller 520, and an ID detector enabler 530.

The example USB data controller 510 of the illustrated example of FIG. 5 communicates data to and/or from the USB transceiver 405 of FIG. 4. In some examples, the example data lines are used to communicate an instruction to the USB transceiver 405 to become disabled. Disabling the USB transceiver 405 reduces power consumption during low power modes (e.g., during shutdown). In the illustrated example of FIG. 5, the example USB data controller 510 receives an ID digital signal from the example USB PHY 115. The ID digital signal enables the USB data controller 510 to detect, while the MCU 102 is in an active mode, that a USB micro-A plug has been inserted into the USB receptacle 105. Detection of the insertion of the USB micro-A plug instructs the USB data controller 510 to initiate operation as a USB A device.

The example power mode controller 520 of the illustrated example of FIG. 5 identifies a desired power mode for operation of the MCU 102. In examples disclosed herein, the example power mode controller 520 transmits instructions to enter and/or exit particular power modes. For example, upon determining that a shutdown mode (e.g., LPM4.5 in a Texas Instruments (TI) mixed signal processor (MSP) MCU, etc.) the example power mode controller 520 instructs the USB transceiver 405 to become disabled (e.g., via the example USB data controller 510), instructs the ID detector enabler 530 to enable the ID detector 117, and instructs the PCM 135 to disable components (e.g., the core regulator) of the PSS 140.

The example ID detector enabler 530 of the illustrated example of FIG. 5 enables and/or disables the example ID detector 117. When enabling the example ID detector 117, the switch 410 of FIG. 4 is closed such that the ID detector 117 can detect the presence of a USB micro-A plug inserted into the receptacle 105. In examples disclosed herein, the example ID detector enabler 530 also informs the PCM 135 that the ID detector 117 has been enabled. Informing the PCM 135 that the ID detector 117 has been enabled allows the example PCM 135 to detect a status change in the output of the example ID detector 117.

Figure 6:
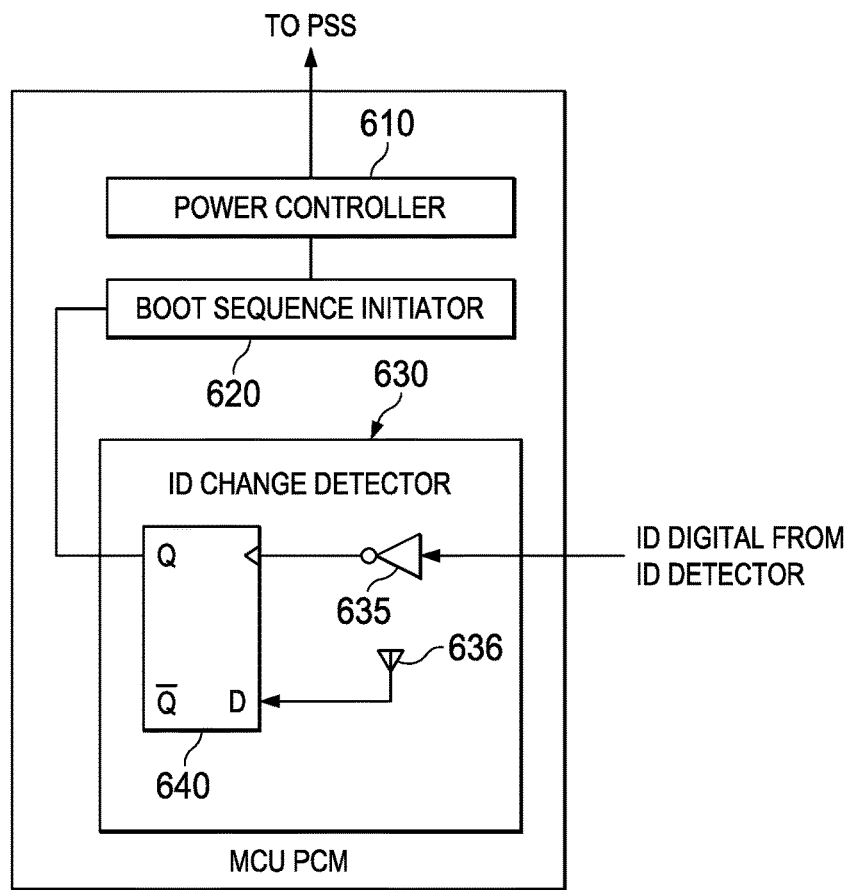
FIG. 6 is a block diagram of an example implementation of the power control module (PCM) of FIG. 1.

FIG. 6 is a block diagram of an example implementation of the PCM 135 of FIG. 1. In the illustrated example of FIG. 6, the example PCM 135 includes a power controller 610, a boot sequence initiator 620, and an ID change detector 630.

The example power controller 610 of the illustrated example of FIG. 6 controls the example core regulator 145 of FIG. 1. In examples disclosed herein, the example power controller 610 receives an instruction from the OTG controller 110 to disable the core regulator 145. Disabling the core regulator disables the OTG controller 110, along with other devices and/or circuits of the MCU 102. Any circuits that still remain active while the core regulator 145 is disabled (e.g., the ID detector 117 of FIGS. 1 and/or 4) draw power from the power storage circuitry 141. As such, when the core regulator is disabled, power draw is minimized, thereby extending an available life of the charge present in the power storage circuitry 141.

The example boot sequence initiator 620 of the illustrated example of FIG. 6 initiates a boot sequence of the MCU 102. In examples disclosed herein, the example boot sequence includes instructing the example power controller 610 to enable the core regulator 145, thereby powering the OTG controller 110. Upon application of power from the core regulator 145 to the OTG controller 110, the example OTG controller enables the USB transceiver 405. In some examples, the example power controller 610 enables the LDO 150 such that the LDO 150 may begin regulating voltages received via the LDOIN pinout 152, and outputting the regulated voltage to the LDOO pinout 154.

The example ID change detector 630 of the illustrated example of FIG. 6 includes an inverter 635 and a flip flop 640. The example ID change detector 630 monitors an input received from the ID detector 117 of the PHY 115 to identify when a boot procedure should be initiated. The example inverter 635 inverts an input received from the ID detector 117. For example, when the OTG controller 110 has closed the switch 410 and a USB micro-A cable is inserted, an output of the inverter 635 is transitioned from a binary zero to a binary one. Inverting the binary input at the inverter 635 results in the flip flop 640 detecting a next rising edge indicating that a micro-A USB plug has been inserted into the receptacle 105.

The example flip flop 640 receives an input from the ID detector 117 via the example inverter 635. In examples disclosed herein, the example flip flop 640 is implemented as a D flip flop; however, the example flip flop 640 may be implemented in any other fashion and/or by any other circuitry. For example, the example flip flop 640 may be implemented by an AND gate. In examples disclosed herein, the input from the ID detector 117 is received at a clock input of the example flip flop 640. In examples disclosed herein, a D input of the example flip flop 640 is tied to a binary value of one 636. The example flip flop 640, upon detecting a rising edge at the clock input (e.g., received from the ID detector 117), sets the output Q to a binary one. In examples disclosed herein, the example flip flop 640 is reset upon entry into the low power mode (i.e., the output Q is set to a binary zero). However, the example flip flop 640 may be reset in response to any other indication such as, for example, an indication from the example inverter 635 that the switch 410 has been closed (e.g., that ID detection has been enabled). The output of the flip flop 640 remains a binary one until the example flip flop 640 is reset.

While an example manner of implementing the example PHY 115 of FIG. 1 is illustrated in FIG. 4, one or more of the elements, processes and/or devices illustrated in FIG. 4 may be combined, divided, re-arranged, omitted, eliminated and/or implemented in any other way. While an example manner of implementing the example OTG controller 110 of FIG. 1 is illustrated in FIG. 5, one or more of the elements, processes and/or devices illustrated in FIG. 5 may be combined, divided, re-arranged, omitted, eliminated and/or implemented in any other way. While an example manner of implementing the example PCM 135 of FIG. 1 is illustrated in FIG. 6, one or more of the elements, processes and/or devices illustrated in FIG. 6 may be combined, divided, re-arranged, omitted, eliminated and/or implemented in any other way. Further, the example USB transceiver 405, the example ID detector 117, and/or, more generally, the example USB PHY 115 of FIGS. 1 and/or 4, the example USB data controller 510, the example power mode controller 520, the example ID detector enabler 530, and/or, more generally, the example OTG controller 110 of FIGS. 1 and/or 5, the example power controller 610, the example boot sequence initiator 620, the example ID change detector 630, and/or, more generally, the example PCM 135 of FIGS. 1 and/or 6, the example PSS 140, the example core regulator 145, and/or more generally, the example MCU 102 of FIG. 1 may be implemented by hardware, software, firmware and/or any combination of hardware, software and/or firmware. Thus, for example, any of the example USB transceiver 405, the example ID detector 117, and/or, more generally, the example USB PHY 115 of FIGS. 1 and/or 4, the example USB data controller 510, the example power mode controller 520, the example ID detector enabler 530, and/or, more generally, the example OTG controller 110 of FIGS. 1 and/or 5, the example power controller 610, the example boot sequence initiator 620, the example ID change detector 630, and/or, more generally, the example PCM 135 of FIGS. 1 and/or 6, the example PSS 140, the example core regulator 145, and/or more generally, the example MCU 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example USB transceiver 405, the example ID detector 117, and/or, more generally, the example USB PHY 115 of FIGS. 1 and/or 4, the example USB data controller 510, the example power mode controller 520, the example ID detector enabler 530, and/or, more generally, the example OTG controller 110 of FIGS. 1 and/or 5, the example power controller 610, the example boot sequence initiator 620, the example ID change detector 630, and/or, more generally, the example PCM 135 of FIGS. 1 and/or 6, the example PSS 140, the example core regulator 145, and/or more generally, the example MCU 102 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example MCU 102 of FIG. 1 may include one or more elements, processes and/or devices in addition to, or instead of, those illustrated in FIG. 1, and/or may include more than one of any or all of the illustrated elements, processes and devices.

Figure 7:
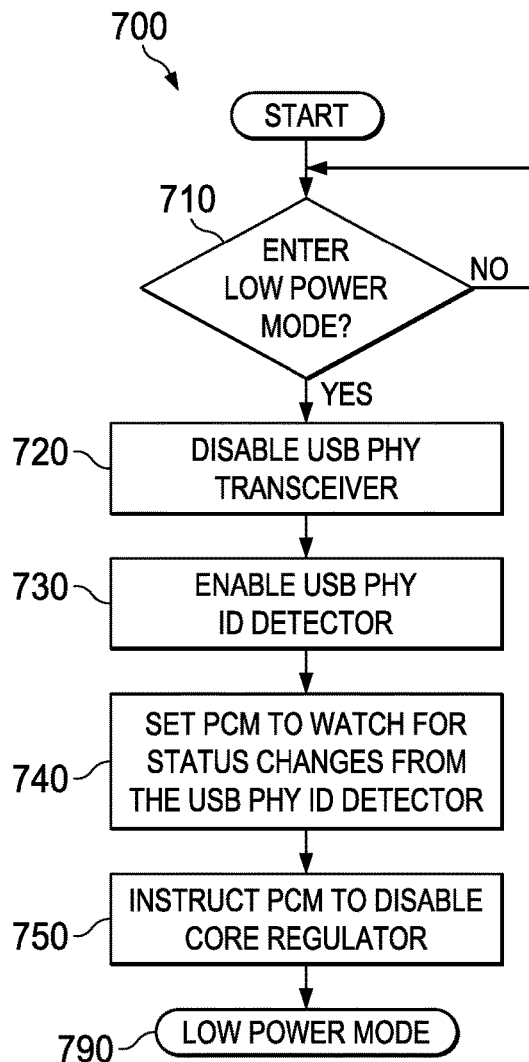
FIG. 7 is a flowchart representative of example machine readable instructions which, when executed, cause the example microcontroller unit (MCU) of FIG. 1 to enter a low power mode.

Flowcharts representative of example machine readable instructions for implementing the example MCU 102 of FIG. 1 are shown in FIGS. 7 and/or 8. In these example(s), the machine readable instructions comprise a program(s) for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart(s) illustrated in FIGS. 7 and/or 8, many other methods of implementing the example MCU 102 may alternatively be used. For example, the order of execution of the blocks may be changed, and/or some of the blocks described may be changed, eliminated, or combined.

As mentioned above, the example processes of FIGS. 7 and/or 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 7 and/or 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 7 is a flowchart representative of example machine readable instructions 700 which, when executed, cause the MCU 102 to enter a low power mode. In examples disclosed herein, the low power mode is a shutdown mode. However, any other low power mode may additionally or alternatively be used. The example program 700 of FIG. 7 begins when the example OTG controller 110 determines whether to enter the low power mode (Block 710). The example OTG controller 110 may determine to enter the low power mode in response to, for example, a command received from a user, a command received from a program executed by the MCU 102, etc. In some examples, other factors may additionally or alternatively be considered by the example OTG controller 110 such as, for example, clocking needs of other components of the MCU 102, operational states of other components of the MCU 102 (e.g., is the LDO 150 operational). In some examples, the example PCM 135 determines whether to enter the low power mode. If the MCU 102 is not to enter the low power mode (Block 710 returns a result of NO), control proceeds to block 710 where the example OTG controller 110 continues to determine whether to enter the low power mode (Block 710).

Upon determination that the example MCU 102 will enter the low power mode (Block 710 returns a result of YES), the example power mode controller 510 of the OTG controller 110 instructs, via the USB data controller 510, the USB transceiver 405 of the example PHY 115 to become disabled (Block 720). Disabling the USB transceiver 405 of the PHY 115 disables communication with external USB devices and reduces power consumption of the MCU 102 by disabling a component of the MCU 102.

The example ID detector enabler 530 of the example OTG controller 110 enables the example ID detector 117 of the example PHY 115 (Block 730). In examples disclosed herein, enabling the example ID detector 117 includes closing the example switch 410 of the example ID detector, thereby enabling current to flow through the pullup resistor 415. Enabling the example ID detector 117 ensures that insertion of a micro-A USB plug (e.g., a USB plug with an ID line tied to ground) can be detected while in the low power mode.

The example power mode controller 520 instructs the PCM 135 to monitor for status changes from the example ID detector 117 of the PHY 115 (Block 740). In the illustrated example of FIG. 7, the example power mode controller 520 instructs the PCM 135 to monitor for status changes by resetting the example flip flop 640 of the example PCM 135. Resetting the example flip flop 640 ensures that a subsequent identification of insertion of a micro-A USB plug will result in a determination that the MCU should wake from the low power mode.

The example power mode controller 520 instructs the PCM 135 to disable the core regulator 145 (Block 750). Disabling the core regulator 145 causes the PSS 140 to cease supply of power to the OTG controller 110. Upon termination of the power supplied to the OTG controller 110, the example MCU 102 is in low power mode 790. In the low power mode 790, the ID detector 117 of the example PHY 115 is enabled. However, other components of the example PHY 115 (e.g., the example USB transceiver 405) are disabled (e.g., do not consume power). In the low power mode 790, the example ID detector 117 receives power supplied by the power storage circuitry 141.

Figure 8:
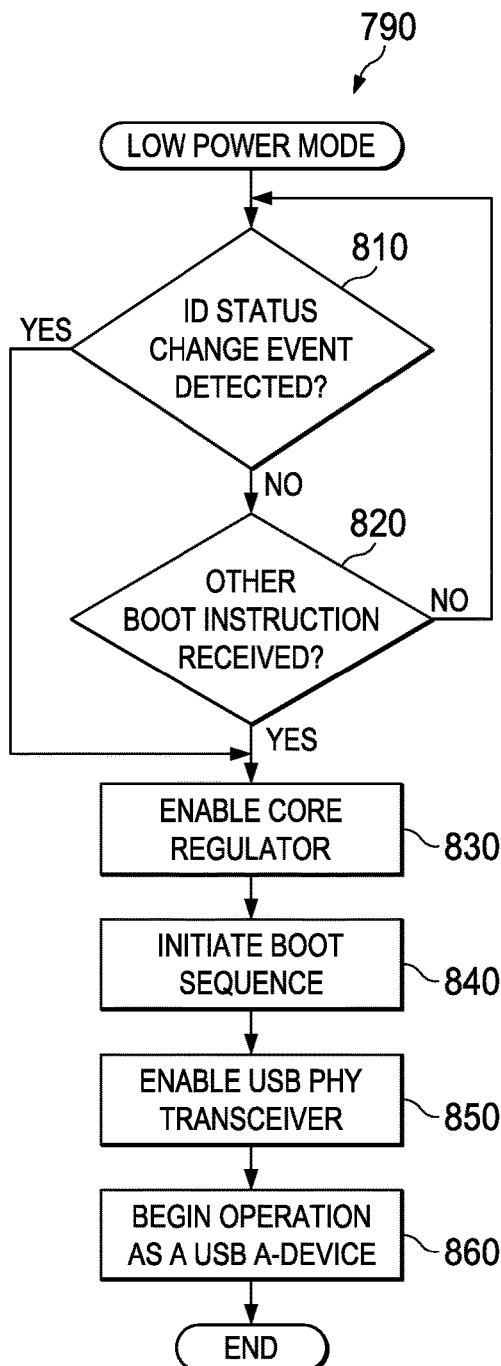
FIG. 8 is a flowchart representative of example machine-readable instructions which, when executed, cause the example MCU of FIG. 1 to identify insertion of a micro-A USB plug and exit the low power mode.

FIG. 8 is a flowchart representative of example machine-readable instructions 790 which, when executed, cause the example MCU 102 to identify insertion of a micro-A USB plug and exit the low power mode. The example program 800 of FIG. 8 begins at block 810 when the example ID change detector 630 determines whether an ID status change event has been detected (Block 810). In the illustrated example of FIG. 8, the ID status change event is detected by monitoring an output of the example flip flop 640 of the ID change detector 630 of FIG. 6. If, for example, the example flip flop 640 indicates a binary one, then the ID detector 117 has detected that a micro-A USB plug has been inserted.

If, for example, a USB micro-B plug were inserted into the receptacle 105 (e.g., such that the ID pinout 126 were not tied to ground), the example ID detector 117 would not detect that a USB micro-A plug had been inserted, and the ID detector 117 would indicate that no status change has been detected. If no status change has been detected (Block 810 returns a result of NO), the example PCM 135 identifies whether another boot instruction has been received (Block 820). In examples disclosed herein, the example PCM 135 identifies whether another boot instruction has been received by monitoring a general purpose input/output (GPIO) of the MCU 102. The GPIO may indicate, for example, that a user has depressed a power button of the MCU. However, any other approach to detecting a boot instruction may additionally or alternatively be used.

Upon identification that the MCU 102 should be booted (Block 810 returns a result of YES, Block 820 returns a result of YES), the example PCM 135 enables the core regulator 145 (Block 830). Enabling the core regulator enables supply of power to the OTG controller 110. The example OTG controller 110 initiates a boot sequence (Block 840). The example OTG controller 110 enables the USB transceiver 405 of the example PHY 115 (Block 850). The example MCU 102 then begins operation as a USB A-device (Block 860).

Figure 9:
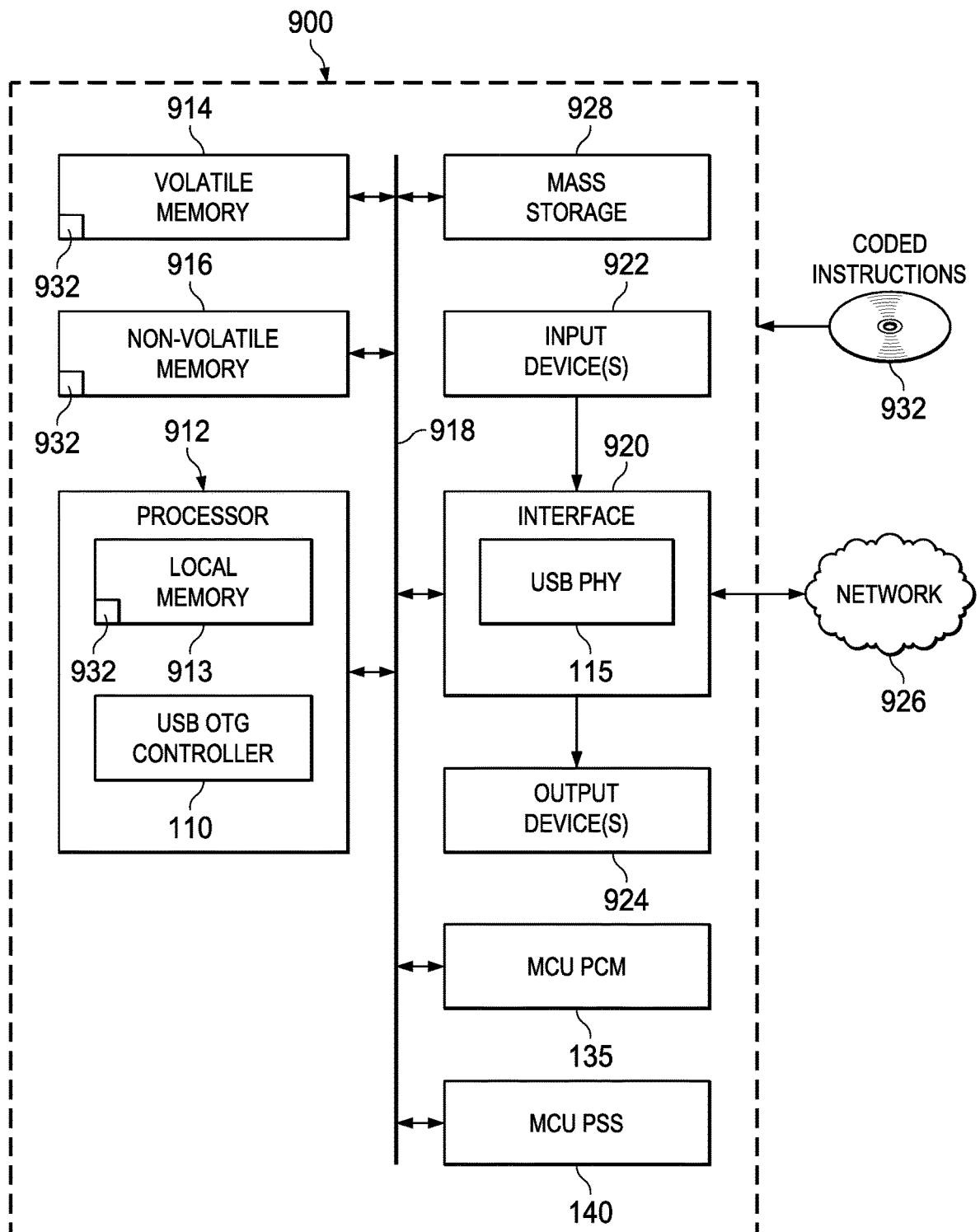
FIG. 9 is a block diagram of an example processor platform capable of executing the instructions of FIGS. 7 and/or 8 to implement the example MCU of FIG. 1.

FIG. 9 is a block diagram of an example processor platform 900 capable of executing the instructions of FIGS. 7 and/or 8 to implement the MCU 102 of FIG. 1. The processor platform 900 can be, for example, a microcontroller, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). In some examples, the processor 912 of the illustrated example of FIG. 9 executes instructions to implement the example OTG controller of FIG. 1. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface. In some examples, the example interface circuit 920 implements the example USB PHY 115 of FIG. 1.

In the illustrated example, one or more input devices 922 are connected to the interface circuit 920. The input device(s) 922 permit(s) a user to enter data and commands into the processor 912. The input device(s) can be implemented by, for example, a general purpose input/output (GPIO), an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 7 and/or 8 may be stored in the mass storage device 928, in the volatile memory 914, in the non-volatile memory 916, and/or on a removable tangible computer readable storage medium such as a CD or DVD.

From the foregoing, it will appreciate that the above disclosed methods, apparatus, and articles of manufacture enable detection of a change in a status of insertion of a micro-A USB plug. In examples disclosed herein, ID detection circuitry is included in a USB physical layer (PHY) circuit of the MCU. However, the ID detection circuitry is not disabled during a low power mode (e.g., a shutdown mode). In contrast, other components of the PHY circuit (e.g., a transceiver) are disabled during the low power mode.

Disabling components of the PHY circuit except for the ID detection circuitry reduces power consumption during the low power mode, while retaining functionality to detect insertion of a micro-A USB plug.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An integrated circuit comprising:
    a voltage supply pin configured to couple to a receptacle that supports a first type of plug and a second type of plug;
    a set of data pins configured to couple to the receptacle;
    a fourth pin configured to couple to the receptacle;
    a physical layer circuit including:
        a transceiver coupled to the set of data pins; and
        a detector circuit coupled to the voltage supply pin that includes a resistor coupled between the voltage supply pin and the fourth pin, wherein the detector circuit is configured, when enabled, to:
            determine whether the receptacle is coupled to the first type of plug based on whether current flows from the voltage supply pin to the resistor; and
            provide a signal that specifies whether the receptacle is coupled to the first type of plug;
    a power control circuit that includes a flip flop coupled to the physical layer circuit, wherein the power control circuit is configured to:
        receive the signal; and
        based on the signal specifying that the receptacle is coupled to the first type of plug, cause a boot sequence to be initiated; and
    a controller coupled to the transceiver and to the detector circuit, the controller configured to:
        disable the transceiver and enable the detector circuit, responsive to the integrated circuit entering a first power mode;
        receive the signal from the detector circuit; and
        responsive to the signal specifying that the receptacle is coupled to the first type of plug, enable the transceiver and disable the detector circuit.

2. The integrated circuit of claim 1, wherein the detector circuit includes a switch coupled in series with the resistor between the voltage supply pin and the fourth pin, and the controller is configured to close the switch responsive to the integrated circuit entering the first power mode.

3. The integrated circuit of claim 1, wherein the first power mode is a shutdown mode.

4. The integrated circuit of claim 1, wherein the flip flop is a delay flip flop.

5. The integrated circuit of claim 1 further comprising a power regulator, wherein the power control circuit is configured to enable the power regulator responsive to the signal from the detector circuit.

6. The integrated circuit of claim 1, wherein the detector circuit comprises:
    a switch connected in series with the resistor between the voltage supply pin and the fourth pin;
    a level shifter comprising an amplifier, the level shifter having an input coupled to the fourth pin; and
    a second inverter having an input coupled to an output of the level shifter and an output to generate the signal from the detector circuit.

7. The integrated circuit of claim 1, further comprising the receptacle coupled to the voltage supply pin, the set of data pins, and the fourth pin, the integrated circuit configured to provide a voltage on the voltage supply pin responsive to receiving a USB micro-A plug into the receptacle.

8. The integrated circuit of claim 7, wherein the integrated circuit is configured to not provide the voltage on the voltage supply pin responsive to receiving a USB micro-B plug into the receptacle.

9. The integrated circuit of claim 1, wherein:
    the voltage supply pin is a Universal Serial Bus (USB) VBUS pin; and
    the fourth pin is a USB ID pin.

10. A method comprising:
    detecting that a microcontroller unit is to enter a low power mode; and
    in response to detecting that the microcontroller unit is to enter the low power mode:
        disabling a transceiver and a power regulator of the microcontroller unit; and
        enabling a detector of the microcontroller unit:
        detecting, using the detector and a resistor coupled between a Universal Serial Bus (USB) VBUS pin and a USB identification (ID) pin, whether a USB micro-A plug or a USB micro-B plug is inserted into a USB receptacle coupled to the microcontroller unit, wherein the detecting is based on whether current flows from the VBUS pin through the resistor;
    providing, using the detector, a signal that specifies whether the USB micro-A plug is inserted into the USB receptacle to a power control circuit;
    based on the signal specifying that the USB micro-A plug is inserted into the USB receptacle, causing, using a flip flop of the power control circuit, a boot sequence to be initiated; and
    causing the microcontroller unit to exit the low power mode responsive to the signal specifying that the USB micro-A plug is inserted into the USB receptacle, in which exiting the low power mode includes enabling the transceiver and the power regulator.

11. The method of claim 10, wherein the low power mode is a shutdown mode.

12. The method of claim 10, further comprising, upon receiving the signal from the detector, initializing operation of the microcontroller unit as a USB host device.

13. The method of claim 10, wherein detecting that the USB micro-A plug is inserted into the USB receptacle includes determining, using the resistor, that the USB ID pin is shorted to ground.

14. A device comprising:
    a power regulator;
    a voltage supply pin configured to couple to a receptacle that supports a first type of Universal Serial Bus (USB) plug and a second type of USB plug;
    a set of data pins configured to couple to the receptacle;
    a fourth pin configured to couple to the receptacle;
    a USB physical layer (PHY) circuit including:
        a transceiver coupled to the set of data pins; and
        a detector circuit that includes a resistor coupled between the voltage supply pin and the fourth pin and configured, when enabled, to:
            determine, based on whether current flows from the voltage supply pin through using the resistor, whether the receptacle is coupled to the first type of USB plug; and provide a signal that specifies whether the receptacle is coupled to the first type of USB plug;

a USB controller coupled to the transceiver and to the detector circuit, the USB controller configured to:
  disable the transceiver and enable the detector circuit, responsive to the device entering a first power mode;
  receive the signal from the detector circuit; and
  responsive to the signal specifying that the receptacle is coupled to the first type of USB plug, enable the transceiver; and a power control circuit coupled to the detector circuit and the power regulator, wherein the power control circuit includes a flip flop coupled to the detector circuit, and wherein the power control circuit is configured to:
  disable the power regulator responsive to the device entering the first power mode;
  receive the signal from the detector circuit; and
  responsive to the signal specifying that the receptacle is coupled to the first type of USB plug, causing a boot sequence to be initiated that includes enabling the power regulator.

15. The device of claim 14, further comprising the receptacle coupled to the voltage supply pin, the set of data pins, and the fourth pin, the device configured to provide a voltage on the voltage supply pin responsive to receiving a USB Micro-A plug into the receptacle.

16. The device of claim 15, wherein the receptacle is a USB Micro-AB receptacle.

17. The device of claim 16, wherein the device is configured to not provide the voltage on the voltage supply pin responsive to receiving a USB Micro-B plug into the receptacle.

* * * * *